Figure 1:
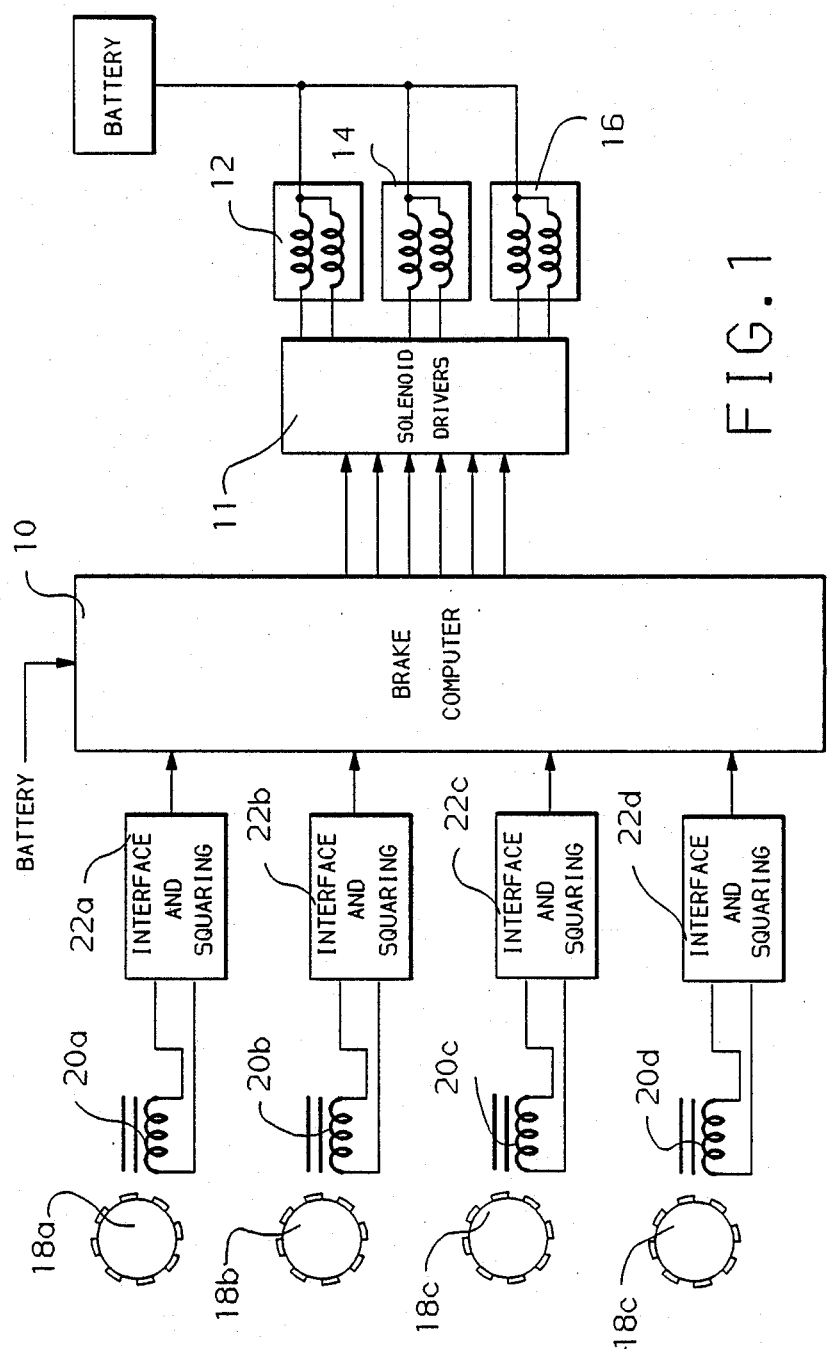

United States Patent [19]

Spadafora et al.

[11] Patent Number: 4,824,184
[45] Date of Patent: Apr. 25, 1989

[54] ANTIBLOCK BRAKE CONTROLLER WITH BRAKE MODE FILTER

[75] Inventors: Peter J. Spadafora, Sterling Heights; Philip M. Headley, Brighton; Alan J. Lee, Farmington Hills, all of Mich.; Jill G. Hersberger, Kokomo, Ind.

[73] Assignees: General Motors Corporation, Detroit; Delco Electronics Corporation, Troy, both of Mich.

[21] Appl. No.: 132,077

[22] Filed: Dec. 11, 1987

[51] Int. Cl.[4] ............................ B06T 8/58; B06T 8/64
[52] U.S. Cl. .................................... 303/100; 303/110; 364/426.02
[58] Field of Search ...................... 303/91, 95, 96, 97, 303/100, 102, 103, 105, 106, 109, 110, 61; 188/181 A, 181 C; 364/426

[56] References Cited

U.S. PATENT DOCUMENTS

| | | | |
|---|---|---|---|
| 3,494,671 | 2/1970 | Slavin et al. | 303/106 |
| 3,697,139 | 10/1972 | Elliott et al. | 303/91 |
| 3,888,548 | 6/1975 | Sharp | 303/97 |
| 3,909,071 | 9/1975 | Klatt | 303/100 |
| 4,230,375 | 10/1980 | Leiber | 303/103 X |
| 4,668,022 | 5/1987 | Sato | 303/96 X |
| 4,701,855 | 10/1987 | Fennel | 303/97 X |

FOREIGN PATENT DOCUMENTS

| | | | |
|---|---|---|---|
| 0966209 | 4/1975 | Canada | 303/103 |
| 1603459 | 11/1981 | United Kingdom . | |

Primary Examiner—Duane A. Reger
Assistant Examiner—Timothy E. Newholm
Attorney, Agent, or Firm—Howard N. Conkey

[57] ABSTRACT

An anti-lock braking control system is described in which the braking pressure cycle is filtered by limiting the minimum time period of each brake pressure cycle. The period from the time a brake pressure release phase is initiated until the next brake pressure release phase is called for is timed. If the time is less than a predetermined value, the brake pressure is held constant until the minimum time period has expired.

1 Claim, 3 Drawing Sheets

ANTIBLOCK BRAKE CONTROLLER WITH BRAKE MODE FILTER

This invention relates to an antilock braking system and more particularly to such a system for filtering the cycling of the brake pressure control modes so as to eliminate rapid brake pressure cycling.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. When the slip value becomes greater than the critical slip value, braking becomes unstable resulting in sudden wheel lockup, reduced vehicle stopping distance and a deterioration in the lateral stability of the vehicle.

To prevent wheel lockup when excessive brake pressure is applied to the wheel brakes by the vehicle operator and to maintain a stable braking condition, antilock braking systems have been proposed that prevent the wheels from locking while being braked. In general, these systems respond to parameters derived from wheel speed such as wheel acceleration or deceleration and wheel slip to control or limit the pressure applied to the wheel brakes. Generally, these systems provide for a decrease in brake pressure when an incipient wheel lockup condition is detected to allow the wheel to recover from the incipient lockup condition followed by a re-application of braking pressure to the wheel. This cycle is rapidly repeated until the vehicle stops or until the operator applied braking pressure is reduced to a level below that which produces an incipient wheel lockup condition.

The release of the brake pressure may include one or more brake pressure release modes. For example, the brake pressure release may comprise a dump mode wherein brake pressure is rapidly decreased and may include a step-down mode in which the brake pressure is ramped downward by stepped reductions in the brake pressure applied to the wheel brakes. Similarly, the pressure application modes may include one or more brake pressure application modes. For example, brake pressure apply may comprise an apply mode in which brake pressure is rapidly increased or a step-up mode in which the brake pressure is ramped upward by stepped increases in the brake pressure. In addition, the braking cycle may include a hold mode wherein the brake pressure is maintained constant. Whether some or all of the foregoing modes are employed in a braking system, the modes are selected based on the selected parameters derived from wheel speed.

While the number of modes used in the braking system may vary, common to the antilock braking systems is the fact that the brake pressure is rapidly cycled in response to the wheel speed or the signals derived therefrom. This rapid brake pressure cycling in the antilock braking system can result in both a stable operation and/or excite resonances in the vehicle that may be objectionable to the vehicle operator.

In order to limit the frequency of the rapid brake pressure cycling, it is common for antilock brake control systems to filter the wheel speed and/or the signals derived therefrom to determine whether the brake pressure should be applied or released. The filter time lag required to filter the wheel speed noise (associated with road surface irregularities or torsional compliance in the axle) is generally too short to reduce the rapid cycling of the brake pressure to a frequency below that which does not excite the vehicle resonances. Therefore, a compromise is generally made between the lag time required to reduce the wheel speed noise to acceptable limits and the amount of lag time required to reduce the rapid cycling of the brake pressure.

The present invention provides for an improved system and method for reducing the rapid brake pressure cycling in an antilock brake controller so as to present a stable operation or excitation of the resonances in the motor vehicle. In accord with this invention, a filter is added to the selection of the particular brake modes (such as apply, release or hold) to thereby limit the frequency of the brake pressure cycling. This allows the brake system designer to reduce the amount of lag in the other filters including the wheel speed filter. By this method, the total system lag time may be reduced while eliminating the pressure cycling at the frequencies which result in a stable operation or excitation of the resonant frequencies of the vehicle. Specifically, this invention imposes a minimum time period on each brake pressure cycle during antilock controlled braking to prevent the frequency of the brake pressure cycling from increasing to a level exciting the resonant frequencies of the vehicle.

Figure 2:
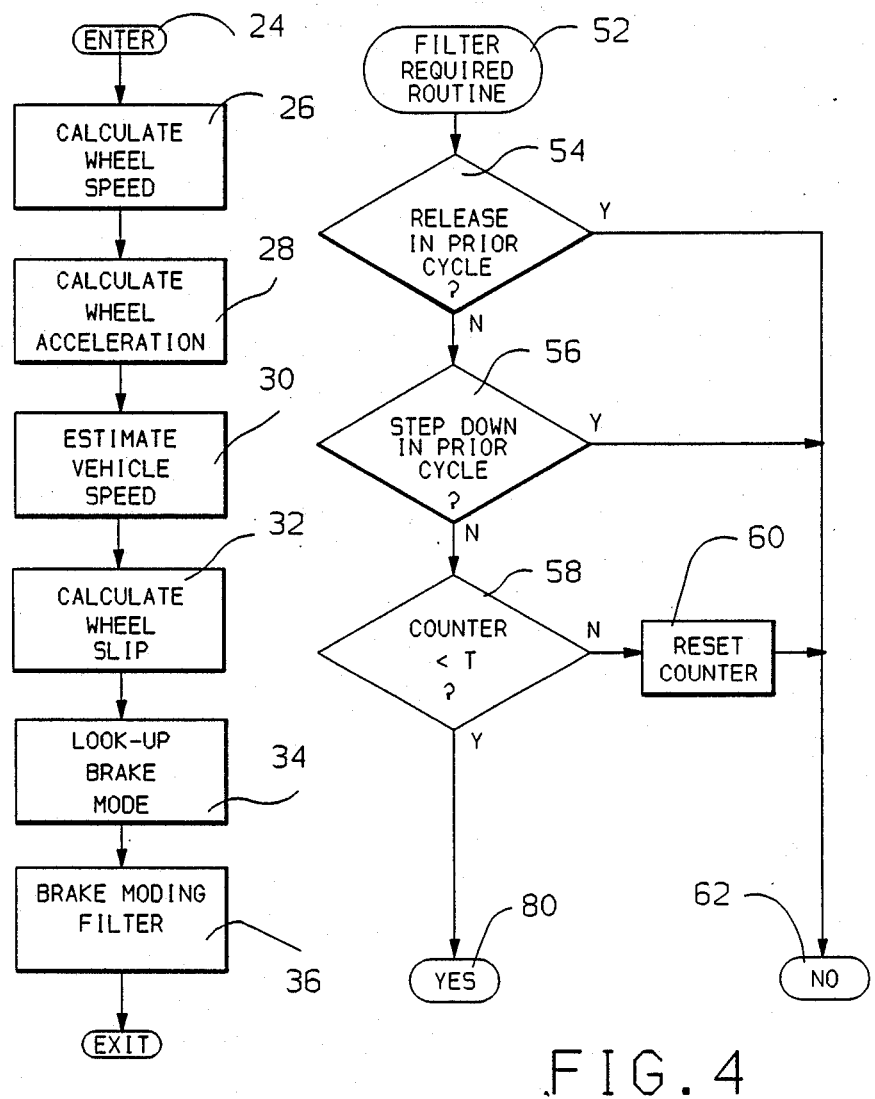
Figure 3:
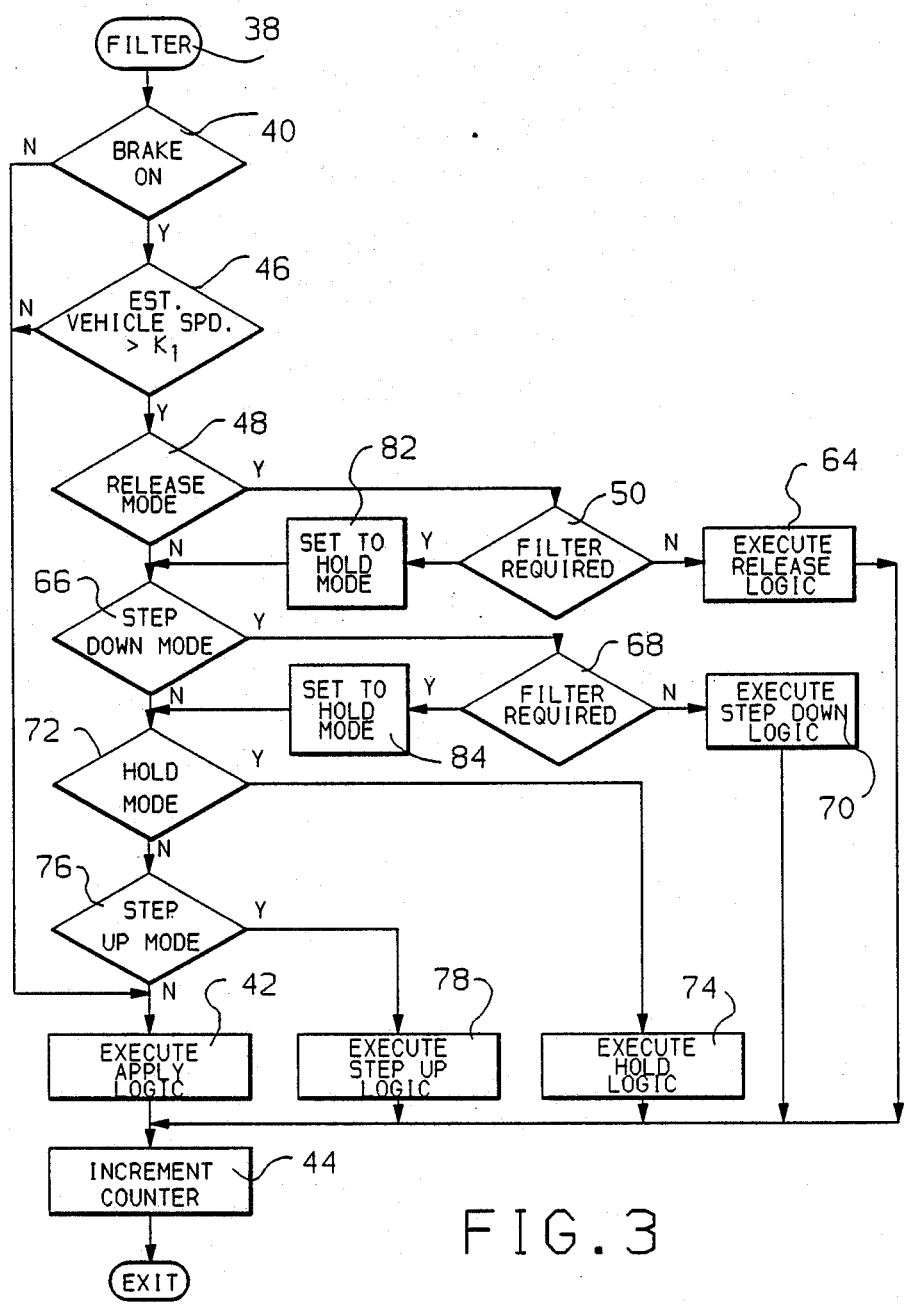

The invention may be best understood by the following description of a preferred embodiment of the invention and the drawings in which:

FIG. 1 is a general diagram of a digital computer in a vehicle antilock braking system; and FIGS. 2-4 are diagrams illustrating the operation of the brake computer of FIG. 1 in carrying out the brake control principles of this invention.

Referring to FIG. 1, a brake computer 10 is responsive to the speed of the vehicle wheels and, when an incipient wheel lockup condition is sensed, controls the brake pressure to the corresponding wheel brakes to prevent wheel lockup. When an incipient wheel lockup condition is sensed, the brake computer 10 issues signals to respective brake pressure control solenoids via solenoid drivers 11 to control the wheel brake pressure to prevent a wheel lockup condition.

The front wheel brakes are controlled by the brake computer 10 by control of the pressure release and hold solenoid pairs generally illustrated as 12 and 14 and the rear brakes are controlled together via the brake pressure release and hold solenoid pair generally illustrated as 16. Brake pressure modulators including two valves operated by a pair of solenoid windings for applying, holding and releasing brake pressure are well known. For example, one of the solenoids in each solenoid pair may control a normally open valve in the brake fluid line between an operator controlled brake pressure source (such as the master cylinder) and the wheel brake cylinder so that when the solenoid is energized to close the valve, the wheel cylinder is isolated from the operator controlled brake pressure source and the second solenoid in each solenoid pair may control a normally closed valve in a brake fluid line between the master cylinder and a fluid reservoir such as the master cylinder fluid reservoir so that when the second solenoid is energized to open the valve, the brake pressure at the wheel brake cylinder is released by dumping the fluid to the reservoir.

With the foregoing valve arrangement, by energizing both solenoids, the brake pressure at the wheel cylinder is rapidly dumped. By energizing the first solenoid and pulsing the second solenoid, the brake pressure at the wheel cylinder may be ramped downward and by deenergizing the second solenoid and pulsing the first solenoid, the brake pressure at the wheel cylinder may be ramped upward toward the operator controlled brake pressure. When both solenoids are deenergized, the brake pressure established by the operation of the master cylinder is applied to the wheel brake cylinder.

The front and rear wheel speeds of the vehicle are detected by respective wheel speed sensors including speed rings 18a thru 18d, each being associated with a respective one of the front and rear wheels of the vehicle. Each speed ring has teeth angularly spaced around its circumference. The teeth of the speed rings are sensed by respective electromagnetic sensors 20a thru 20d as the speed rings are rotated by the respective wheels. The output of each electromagnetic sensor is a sinusoidal waveform having a frequency directly proportional to wheel speed as represented by the passing of the teeth in proximity to the electromagnetic sensor.

The sinusoidal waveforms from the electromagnetic sensors 20a thru 20d are supplied to respective interface and squaring circuits 22a thru 22d, each of which provides a squarewave output having a frequency directly proportional to the speed of a respective wheel.

The brake computer 10 takes the form of a standard digital computer that includes a central processing unit (CPU) which executes an operating program permanently stored in a read-only memory (ROM) which also stores tables and constants utilized in controlling the wheel brake pressure in response to a detected incipient wheel lockup condition. The computer also includes a random access memory (RAM) into which data may be temporarily stored and from which data may be read at various address locations determined in accord with the program stored in the ROM. The brake computer 10 further includes a clock generating high frequency clock signals for timing and control purposes.

The computer 10 provides a periodic interrupt at predetermined intervals such as at 10 millisecond intervals at which tim a program stored in the ROM for calculating the wheel speeds and for controlling the solenoid pairs 12, 14 and 16 is executed. In addition, the computer responds to each selected edge of the wheel speed squarewave signal from the interface and squaring circuits 22a thru 22d and executes a wheel speed interrupt routine stored in the ROM during which information required to calculate wheel speed is stored. While this interrupt routine may take standard form, one such form is illustrated in the copending application Ser. No. 054,292, filed on May 26, 1987, and assigned to the assignee of this invention.

The 10 millisecond interrupt routine executed by the brake computer 10 for controlling the windings in the solenoid winding pairs 12, 14 and 16 and for providing filtering in the brake pressure control mode selection in accord with the principles of this invention is illustrated in FIGS. 2 through 4. Referring to FIG. 2, the 10 millisecond routine is generally illustrated. The 10 millisecond routine illustrated in the FIGURES is executed once for each front wheel and once for each rear wheel pair during each 10 millisecond interval, the rear wheels being controlled in response to the wheel having the lowest wheel speed.

The program begins at step 24 and proceeds to a step 26 where the wheel speed of the selected wheel is calculated based on the time for a counted number of squarewave pulses or, in another embodiment, based on the number of clock pulses generated over the period of each squarewave pulse from the interface and squaring circuits. From step 26, a step 28 is executed where the acceleration of the wheel is calculated. At step 30 the speed of the vehicle is estimated based on the speeds of the four vehicle wheels in conjunction with a maximum possible vehicle deceleration. The algorithm for estimating vehicle speed at step 30 is well known in antilock braking systems.

At step 32, the program determines the value of wheel slip based on the difference between the wheel speed and the estimated vehicle speed. Thereafter, the program determines the braking mode for limiting the brake pressure applied to the vehicle wheel brakes for preventing a lockup condition. In the present embodiment, the brake pressure control mode is determined via a lookup table stored in the ROM. The lookup table contains memory locations storing the desired brake pressure control mode as a function of the amount of wheel slip determined at step 32 and wheel acceleration or deceleration determined at step 28. Further, in this embodiment, the brake mode may comprise one of five modes.

Two of the pressure control modes relate to a brake pressure reduction phase. The first is a release mode which provides for a quick release of wheel brake pressure and the second is a step-down mode which provides for a stepped or ramped reduction in the brake pressure. A third pressure control mode is a hold mode that provides for maintaining the brake pressure constant. The final two pressure control modes relate to a brake pressure apply phase. The first is a step-up mode that provides for a stepped or ramped increase in the brake pressure and the second is an apply mode wherein the brake pressure is rapidly increased toward the pressure called for by the vehicle operator.

By addressing the lookup table as a function of wheel deceleration or acceleration and wheel slip, the particular mode required to control the brake pressure is obtained. For example, a particular deceleration and slip value representing an incipient wheel lockup condition will result in a command for a release mode being retrieved from the lookup table memory. In response to this mode, and as will be described, the brake pressure is released (or ramped in a decreasing direction) in order to prevent an incipient wheel lockup condition. Similarly, the remaining modes are retrieved from memory to establish the cyclic operation of the brake pressure to provide antilock brake pressure control. In general, each brake pressure cycle of the cyclic operation established by the lookup table in response to wheel acceleration (or deceleration) and wheel slip includes a brake pressure release phase and apply phase and may also include a hold phase. The nature of these cycles and the selection of the braking modes forming the cycles based on wheel speed based parameters are well known.

At step 36, the brake moding filter routine incorporating the principles of this invention is executed. In general and as will be described with respect to FIG. 4, the brake moding filter routine provides for establishing a minimum cycle time T equal to the cycle time 1/f where f is the maximum allowable frequency of the brake pressure control cycle. This frequency is selected to be less than the frequencies determined to excite the resonant frequencies of the vehicle. In one embodiment, the time T is equal to 50 milliseconds. Following step 36, the program exits the 10 millisecond interrupt routine.

Referring to FIG. 3, the brake moding filter routine 36 of FIG. 2 is entered at point 38 and proceeds to a step 40 where the program determines whether or not the vehicle brakes are being operated by the vehicle operator. This may be determined by the brake computer 10 of FIG. 1 by monitoring the output of the brake switch controlling the vehicle brake lights. If the brakes are not being operated, the program proceeds to a step 42 where an apply logic is executed. At this step the solenoid windings in the solenoid winding pair 12, 14 or 16 associated with the selected wheel are controlled so as to establish an apply mode. In the specific solenoid valve arrangement previously described, this is accomplished by deenergizing both of the solenoid windings. In this mode, the brake pressure established by the vehicle operator via the master cylinder is passed directly to the vehicle wheel brakes.

From step 42 the program proceeds to a step 44 where a counter for timing the period of an antilock braking pressure control cycle for the selected wheel is incremented. As will be described, this counter will time the period from the initiation of a brake pressure reduction phase either via a pressure release mode or a pressure step-down mode.

Returning to step 40, if the system determines that the operator is applying the vehicle brakes, the program proceeds to a step 46 where the estimated vehicle speed determined at step 30 is compared with a calibration constant $k_1$ representing a low vehicle speed below which the antilock brake control system is inoperative. If the speed is below the reference speed, the program proceeds to the steps 42 and 44 previously described.

If the estimated vehicle speed is greater than the reference value, the program proceeds from the step 46 to a step 48 where the program determines whether or not the brake mode determined at step 34 of FIG. 2 is a release mode requiring the brake pressure at the wheel brake to be rapidly reduced. Assuming a release mode was called for at step 34, the program proceeds to a step 50 where it determines whether or not filtering in the selection of the braking modes is required. Filtering is required in accord with the preferred embodiment of this invention if the time period of the present antilock braking cycle beginning with the last pressure reduction phase (via either the pressure release mode or the pressure step-down mode) is less than the value T, recalling that this is the minimum allowable braking cycle period. This determination is made at step 50 by execution of the filter required routine illustrated in FIG. 4.

Referring to FIG. 4, the filter required routine is entered at step 52 and proceeds to a step 54 where it determines whether or not the brake of the selected wheel was in a pressure release mode in the prior 10 millisecond interrupt interval. Assuming that step 54 determines that a pressure control mode other than a release mode was in effect during the prior 10 millisecond interrupt period, the program proceeds to a step 56 to determine whether or not a step-down mode was in effect during the prior 10 millisecond interrupt interval. Again assuming that a pressure control mode other than the step-down mode was in effect during the prior 10 millisecond interrupt interval, the program proceeds to a step 58 where the counter timing the braking cycle is sampled and compared with a count $C_T$ representing the minimum allowable cycle time T for each antilock braking pressure control cycle. Assuming that the count in the counter is greater than $C_T$ representing the minimum allowable time T, the program proceeds to a step 60 where the counter is reset to begin timing of the braking cycle.

From step 60, the program proceeds to point 62 where the filter required routine indicates that filtering of the brake pressure control cycle is not required.

Returning to the step 50 of FIG. 3 and assuming the filter required routine of FIG. 4 determined that filtering of the brake pressure cycle was not required, the program proceeds to a step 64 where a release logic routine is executed. This step provides for controlling the solenoid pair 12, 14 or 16 associated with the selected wheel to rapidly reduce the brake pressure to quickly reduce the braking force to allow the wheel speed to recover from a detected incipient wheel lockup condition. From step 64, the program proceeds to step 44 where the counter timing the braking cycle is incremented. Since this counter was reset at step 60 when the release mode was first detected, the count in the counter represents the time since the braking cycle began beginning at the initiation of the release mode.

Returning to step 48, if the program determines that the mode selected at step 34 was not a release mode, a step 66 is executed which determines whether or not the mode selected at step 34 was a step-down mode. Assuming that a step-down mode was selected, the program proceeds to a step 68 which again executes the filter required routine of FIG. 4. This routine is executed following the selection of a step-down mode since some pressure reduction phases of the braking cycles may begin with a step-down mode to reduce the braking pressure as opposed to the release mode.

Again referring to FIG. 4, if the step-down mode followed a release mode indicating that the pressure reduction phase of the braking cycle began with a release mode and the step-down mode was first selected at step 34 in the present 10 millisecond interrupt interval, the program proceeds from step 54 to step 62, the operating mode in the prior interrupt interval having been a release mode. If, however, the braking cycle began with a step-down mode, the program proceeds from step 54 to a step 56 which determines whether or not the step-down mode was in effect in the prior 10 millisecond interrupt interval. Assuming the step-down mode was first selected at step 34 in the present 10 millisecond interrupt interval, the program proceeds to step 58 where the count in the counter timing the braking cycle is sampled. Assuming the value is greater than $C_T$, the program proceeds to step 60 where the counter is reset to begin timing the brake pressure control cycle and then to step 62 to indicate that mode selection filtering is not required.

Returning to step 56, if the step-down mode followed a release mode, step 56 will first be executed during the second 10 millisecond interrupt interval after the selection of the step-down mode at step 34. As a result, step 56 will determine that the step-down mode was in effect in the prior program cycle so that the program next proceeds to step 62 to indicate that filtering of the mode selection is not required.

Returning to step 68 of FIG. 3, when it is determined that filtering of the mode selection is not required, the program proceeds to a step 70 where a step-down logic routine controls the solenoid winding pair 12, 14 or 16 of the selected wheel so as to ramp the brake pressure downward. Through repeated executions of the 10 millisecond interrupt routine, the step-down logic provides for a ramped decrease in the braking pressure to allow the wheel speed to recover from the incipient wheel lockup condition. From step 70, the program proceeds to step 44 where the counter timing the braking cycle is incremented.

Returning to step 66, if the program determines that the step-down mode was not selected at step 34, the program proceeds to a step 72 where it determines whether or not a hold mode was selected whereby the brake pressure applied to the wheel brakes is to be held at a constant value. Assuming a hold mode was selected, the program proceeds to a step 74 where the solenoid pair 12, 14 or 16 associated with the selected wheel is controlled so as to maintain the pressure applied to the wheel brake constant.

If step 72 determines that a hold mode was not selected at step 34, the program proceeds to a step 76 which determines whether or not a step-up mode was selected. If the step-up mode was selected, the program proceeds to a step 78 where the step-up mode logic is executed to ramp the brake pressure upward. From step 78, the program proceeds to a step 44 where the cycle counter is incremented.

If one of the release, step-down, hold or step-up modes is not selected, the conditions exist for quickly increasing the brake pressure. This is accomplished at the step 42 where the apply logic previously described is executed. From step 42, the program increments the counter at step 44.

If subsequent to the resetting of the counter at step 60 upon the first execution of either a release or a step-down operating mode during a braking cycle the program returns to a release mode or step-down mode before expiration of the minimum time period T (the counter incremented to the value $C_T$), the routine of FIG. 4 executed at either step 50 or step 68 proceeds from steps 54 and 56 to step 58 where the count in the counter is determined to be less than the count $C_T$ representing the minimum allowable brake cycle time T. This condition represents a requirement to extend the braking cycle and the program proceeds to point 80 to indicate a requirement for filtering the brake mode selection. When this condition exists, the program proceeds from step 50 to step 82 or from step 68 to step 84 depending upon whether or not a release or step-down operating mode was selected at step 34.

At the step 82 or step 84, the program sets the operating mode to a hold mode. Thereafter the program proceeds from step 72 to the step 74 where the solenoid pair 12, 14 or 16 corresponding to the selected wheel are controlled so as to maintain the braking pressure constant Thereafter, the counter is incremented at step 44. During the following executions of the 10 millisecond interrupt routine, the step 82 or step 84 will be executed and the counter incremented until such time that the step 58 detects that the duration of the brake control cycle becomes equal to the minimum time T represented by the count $C_T$. The next braking cycle may then be allowed to start. This is accomplished by resetting the counter at step 60 and proceeding to point 62 to indicate that filtering is not required The pressure reduction phase is then initiated at step 64 or step 70 depending upon which one of the release or step-down modes was selected at step 34 of FIG. 2.

While the foregoing description of a preferred embodiment involves the operation of a braking cycle that may incorporate five various brake pressure control modes, the invention is applicable to any braking system having greater or less numbers of operating modes. For example, the cycle time may be controlled by operation of a release, hold and apply mode whereby the cycle time is maintained at least greater than a minimum cycle time as previously described. Further, while the braking cycle was indicated as starting at the first selection of a release or a step-down operating mode, the cycle may be determined to begin at any other portion of the braking cycle from which the timing is initiated.

The foregoing description of a preferred embodiment of the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of limiting the brake pressure applied to a wheel brake of a vehicle, the vehicle being characterized in that resonances are excited therein in response to a cycling of the brake pressure at frequencies greater than a predetermined frequency F, the method comprising the steps of:

repeatedly determining a braking mode to establish a brake pressure cycle for limiting the brake pressure applied to the wheel brake to prevent a lockup condition, each determined braking mode comprising one of a pressure release phase, a pressure step down phase, a pressure hold phase and a pressure increase phase;

incrementing a count in a counter for each repeated determination of a braking mode;

resetting the count in the counter when (A) the last determined braking mode is the pressure release phase or a pressure step down phase, (B) the previously determined braking mode was a pressure hold phase or a pressure increase phase, and (C) the count exceeds a value X representing a period equal to 1/F;

resetting the last determined braking mode to the pressure hold phase when (A) the last determined braking mode is the pressure release phase or a pressure step down phase, (B) the previously determined braking mode was the pressure hold phase or a pressure increase phase and (C) the count in the counter is less than X; and controlling the brake pressure applied to the wheel brake in accord with the determined braking phase.

* * * * *